C. D. RIDER.
FISHING REEL.
APPLICATION FILED DEC. 31, 1907.
905,585.
Patented Dec. 1, 1908.
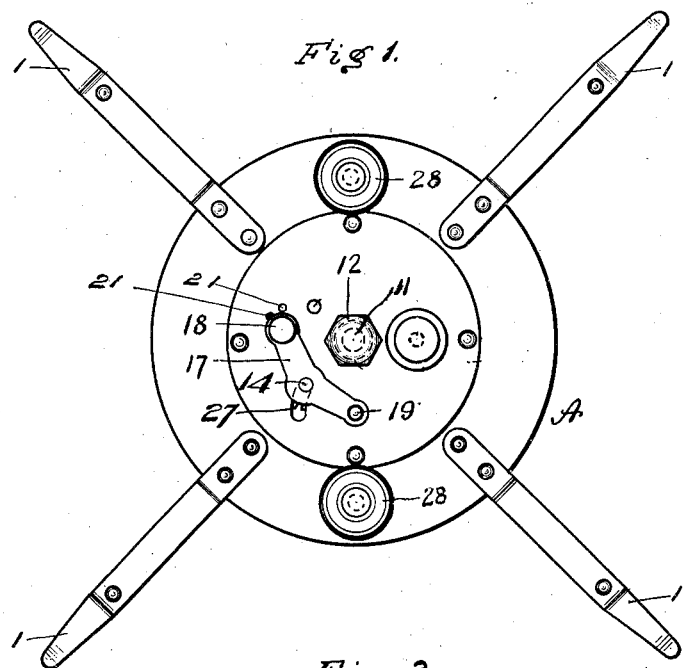
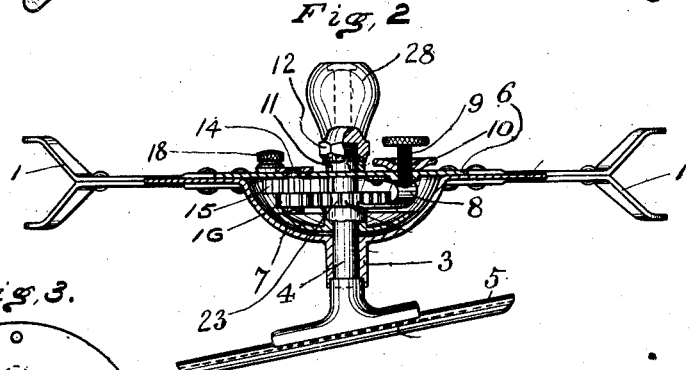
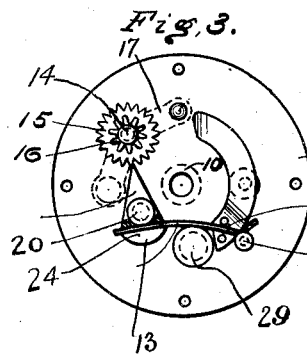
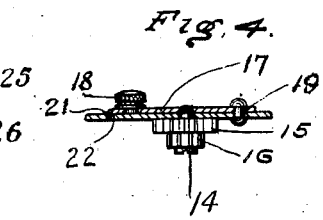
WITNESSES:
INVENTOR
Charles D. Rider
BY
his ATTORNEY

UNITED STATES PATENT OFFICE.

CHARLES D. RIDER, OF FORT WAYNE, INDIANA, ASSIGNOR OF ONE-THIRD TO WILLIAM F. STAHL AND ONE-THIRD TO SAMUEL M. ALEXANDER, OF FORT WAYNE, INDIANA.

FISHING-REEL.

No. 905,585.  Specification of Letters Patent.  Patented Dec. 1, 1908.

Application filed December 31, 1907. Serial No. 408,734.

*To all whom it may concern:*

Be it known that I, CHARLES D. RIDER, a citizen of the United States, residing at Fort Wayne, in the county of Allen and State of Indiana, have invented certain new and useful Improvements in Fishing - Reels, of which the following is a specification.

My invention relates to an improvement in fishing reels, and the object is to provide means whereby the line can be wound and permit the same to dry quickly by being wound upon crotched or forked arms.

Another object is to provide a drag or governor which prevents the reel running too freely thereby allowing too much of the line to run out and to be blown out of alinement with the crotched or forked arms whereby it is badly wound, but by these crotched or forked arms if the line fails to strike the crotched or forked arm in the winding operation the next cast the line will be carried out straight as the crotches are so formed as to allow the line to pass freely by the back or front of the same without catching or getting foul.

Another object is to provide a click, which is generally used for fishing with live bait, which gives an alarm when the fish strikes and permits the fish to run with the line, keeping a certain amount of tension on the same and preventing the reel overrunning and the line becoming loose on the same causing unnecessary winding when taking the fish.

The invention relates to certain novel features of construction and combinations of parts which will be hereinafter described and pointed out in the claims.

In the accompanying drawings Figure 1 is a top plan view, Fig. 2 is a view in side elevation partly in section, Fig. 3 is a bottom plan view of the cover plate, and Fig. 4 is a detail.

A represents the body of the reel and 1, 1 are the forked or crotched arms, which are suitably connected to the body of the reel. The reel A is preferably made concave and is provided with a sleeve 3 mounted upon the stem 4 of the plate 5, which is received on the pole not shown.

A cover 6 is secured to the body of the reel and covering the concave portion, which concave portion forms a surface for thumbing, whereby a certain amount of pressure by the aid of the thumb on the reel acts as a brake and regulates the distance of the cast and prevents the reel from overrunning.

Received within the concave portion and mounted on the stem 4 is a brake disk 7 and a brake 8 in the form of a curved spring which is secured to the cover 6 is caused to engage the brake disk by means of a thumb screw 9 when it is desired to limit or prevent the movement of the reel, which thumb screw can be locked by means of a milled nut 10. The cover surrounds the stem 4 and has a sleeve 11 extending therefrom, over which is a nut 12 which is screwed on to the end of the stem 4.

The click 13 consists of the pawl which is connected to the cover by a pin 20, adapted to engage a toothed disk 15 secured to a gear 16 which is mounted on the pin 14, which is connected to a lever 17, having a knob 18 thereon for operating the same. The lever is pivoted to the cover by means of a pin 19. Indentations 21, 21 are formed in the cover for the end or projection 22 of the lever 17. As the lever is thrown inward the gear 16 is thrown into engagement with a gear 23 which is mounted on the stem 4 so that as the reel is run out it will notify the operator by the click that he has a strike and can best judge as to the amount of line to be let out. The pawl 13 has a slotted end 24 in which a spring 25 is received, which is connected to the cover by means of a pin 26 to give the desired tension to the pawl. The pin 14 travels through a slotted opening 27 in the cover as the lever is operated in throwing the gear 16 into engagement with the gear 23, or out. A stud 29 is secured to the cover back of the spring to keep it in the slot 24. On the outer edges of the reel knobs or handles 28, 28 are secured for winding the line upon the reel.

From the foregoing it will be seen that I have provided a reel whereby a line can be wound and which will permit the air to strike the line instead of its being inclosed as in the ordinary reel, and thereby preventing the line from decaying, as it will have a tendency to dry out quickly instead of holding the moisture.

It is evident that slight changes might be resorted to in the form and arrangement of the several parts described without departing from the spirit and scope of my invention, and hence I do not wish to limit myself to the exact construction herein set forth, but:—

Having fully described my invention, what I claim as new and desire to secure by Letters Patent, is:—

1. A reel comprising a body portion, arms thereon, upon which the line is wound, a stem, a disk mounted on the stem, and a brake engaging the disk for regulating the speed of rotation of the reel.

2. A reel comprising a body portion, a stem, forked arms connected to the body portion, a brake for regulating the speed of the reel, a toothed disk, and a pawl adapted to engage the disk, to give an alarm when the reel is rotated.

3. A reel comprising a body portion, the central portion of which being concave, a stem upon which the body portion is mounted, forked arms connected to the body portion, a cover on the body portion, a gear on the stem, a toothed disk and gear connected to the cover, said gear adapted to engage the first named gear, a pawl adapted to engage the toothed disk, and a lever connected to the gear whereby it is thrown in or out of engagement with first named gear.

4. A reel comprising a body portion, a stem upon which the body portion is mounted, a cover on the body portion, forked arms connected to the body portion, a brake disk mounted on the stem, a brake adapted to engage the disk, a gear mounted on the stem, a lever on the cover, a gear and toothed disk connected to the lever, said gear adapted to be thrown in or out of engagement with the first named gear, and a spring controlled pawl adapted to engage the toothed disk whereby an alarm is sounded as the reel is rotated.

In testimony whereof I affix my signature in presence of two witnesses.

CHARLES D. RIDER.

Witnesses:
M. MacBennett,
Wm. F. Stahl.